United States Patent
Marupaduga et al.

(10) Patent No.: US 10,819,402 B1
(45) Date of Patent: Oct. 27, 2020

(54) GROUPING UES FOR MU-MIMO SERVICE BASED ON COMMONALITY OF PRIMARY SERVING CARRIERS

(71) Applicant: Sprint Spectrum L.P., Overland Park, KS (US)

(72) Inventors: Sreekar Marupaduga, Overland Park, KS (US); Rajveen Narendran, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 102 days.

(21) Appl. No.: 16/213,747

(22) Filed: Dec. 7, 2018

(51) Int. Cl.
| | | |
|---|---|---|
| *H04W 72/04* | (2009.01) | |
| *H04W 72/12* | (2009.01) | |
| *H04W 92/10* | (2009.01) | |
| *H04B 7/06* | (2006.01) | |
| *H04B 7/0452* | (2017.01) | |

(52) U.S. Cl.
CPC ......... *H04B 7/0452* (2013.01); *H04B 7/0617* (2013.01); *H04W 72/0453* (2013.01); *H04W 72/121* (2013.01); *H04W 92/10* (2013.01)

(58) Field of Classification Search
CPC .......... H04W 72/0453; H04W 72/121; H04W 92/10; H04B 7/0617
See application file for complete search history.

(56) References Cited

U.S. PATENT DOCUMENTS

| | | | |
|---|---|---|---|
| 2017/0179985 A1* | 6/2017 | Kim | H04W 8/24 |
| 2019/0013977 A1* | 1/2019 | Harrison | H04L 27/261 |

\* cited by examiner

*Primary Examiner* — Gbemileke J Onamuti

(57) ABSTRACT

When a base station is serving a plurality of devices on a common carrier and the base station is considering which subset of the UEs to group together with each other for MU-MIMO service, the base station could base the decision on a determination of whether the base station is serving the UEs of the subset on a common primary carrier. Or faced with a choice of which subset of UEs to group together with each other for MU-MIMO service, the base station could give priority to grouping UEs that the base station is serving on a common primary carrier, as compared with UEs that the base station is serving on a common carrier but not on a common primary carrier.

20 Claims, 5 Drawing Sheets

GROUPING UES FOR MU-MIMO SERVICE BASED ON COMMONALITY OF PRIMARY SERVING CARRIERS

BACKGROUND

A wireless communication system typically includes a number of base stations that are configured to provide wireless coverage areas in which user equipment devices (UEs) such as cell phones, tablet computers, tracking devices, embedded wireless modules, and other wirelessly equipped communication devices (whether or not user operated), can operate. In turn, each base station could be coupled with a core network that provides connectivity with one or more transport networks, such as the public switched telephone network (PSTN) and/or the Internet for instance. With this arrangement, a UE within coverage of the system could engage in air interface communication with a base station and could thereby communicate via the base station with various remote network entities or with other UEs served by the base station.

Such a system could operate in accordance with a particular radio access technology, with air-interface communications from the base stations to UEs defining a downlink or forward link and air-interface communications from the UEs to the base stations defining an uplink or reverse link.

Over the years, the industry has embraced various "generations" of radio access technologies, in a continuous effort to increase available data rate and quality of service for end users. These generations have ranged from "1G," which used simple analog frequency modulation to facilitate basic voice-call service, to "4G"—such as Long Term Evolution (LTE), which facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive-MIMO, beamforming, and/or other features, to support higher data rates and countless applications, such as mission-critical services, enhanced mobile broadband, and massive Internet of Things (IoT).

In accordance with the radio access technology, each base station could be configured to provide service on one or more carrier frequencies or "carriers." Each carrier could be frequency division duplex (FDD), defining separate frequency channels for downlink and uplink communication, or time division duplex (TDD), defining a single frequency channel multiplexed over time between downlink and uplink use. Each frequency channel of a carrier may occupy a particular frequency bandwidth defining a range of frequency at a particular position (e.g., defined by a center frequency) in radio-frequency spectrum.

Further, on the downlink and uplink, each carrier could be structured to define various physical channels for carrying information between the base stations and UEs. For example, the air interface could be divided over time into frames, each divided in turn into subframes and timeslots, and the carrier bandwidth could be divided over frequency into subcarriers, which could be grouped within each timeslot to define physical resource blocks (PRBs) in which the subcarriers can be modulated to carry data.

When a UE enters into coverage of a base station, the UE could discover threshold strong coverage on one of the base station's carriers and could responsively engage in signaling to connect with the base station on that carrier and to attach or register for service if appropriate. The base station could then serve the UE, coordinating use of the carrier's air-interface resources on an as-needed basis. For example, when the base station has data to transmit to the UE, the base station could allocate particular downlink air-interface resources to carry that data and could accordingly transmit the data to the UE on the allocated downlink resources. And when the UE has data to transmit to the base station, the UE could transmit to the base station an uplink resource grant, the base station could responsively allocate particular uplink air-interface resources to carry the data, and the UE could then transmit the data to the base station on the allocated uplink resources.

In addition, under certain radio access technologies, a base station may be able to serve a UE concurrently on multiple carriers, to help increase the effective bandwidth and associated throughput available to the UE. For instance, if a UE is connected with a base station on a first carrier, the base station may then add one or more second carriers to its service of the UE so as to then provide the UE with "carrier aggregation" service on a combination of the first carrier and the second carrier(s).

In a representative implementation, the carrier on which the UE initially connects with the base station may be considered the UE's primary carrier, and if the base station adds one or more other carriers to the UE's connection, each such additional carrier may be considered a secondary carrier with respect to service of the UE. Further, if the base station serves the UE on a primary carrier in combination with one or more secondary carriers, the primary carrier may be used for both downlink and uplink communications between the base station and the UE, but each secondary carrier may be used to carry just downlink communications between the base station and the UE, particularly to help increase the UE's downlink throughput. Thus, when the base station has data to transmit to the UE, the base station may schedule that transmission on air-interface resources distributed across the UE's primary carrier and one or more secondary carriers. Whereas, when the UE has data to transmit to the base station, the base station may schedule that transmission on air interface resources on just the UE's primary carrier.

Overview

One of the key performance metrics of a wireless communication system is its spectral efficiency, namely, the extent of data that the system can carry per unit of frequency spectrum. The spectral efficiency of a wireless communication system or its base stations could be measured as a quantity of bits per Hertz.

If a wireless communication system has low spectral efficiency, a provider of the system may need to configure the system with additional licensed spectrum, such as wider carriers and/or more carriers, in order to accommodate subscriber communication needs. However, adding licensed spectrum could be costly and therefore undesirable.

One way to help improve spectral efficiency is to make use of MIMO technology.

With MIMO, a base station can engage in air interface communication concurrently on multiple different radio-frequency (RF) propagation paths, or MIMO "layers," with multiple layers occupying the same frequency resources (e.g., subcarriers and PRBs) as each other. To facilitate this, the base station could be equipped with a MIMO antenna array, comprising multiple transmit antennas and multiple receive antennas. By suitably weighting and precoding transmissions by particular antennas in the array, the base station can then output spatially separate but concurrent transmissions for receipt by its served UEs. Because these concurrent transmissions occupy the same frequency resources (e.g., subcarriers) as each other, MIMO can thereby support a greater extent of data communication per unit frequency, thereby increasing the base stations' spectral efficiency and possibly avoiding or deferring the need to add more spectrum.

MIMO service could be used in a "single-user MIMO" (SU-MIMO) configuration to increase the data rate of transmission to a single UE, by multiplexing communications to the UE onto multiple separate layers using the same air-interface resources as each other. For instance, when a base station has data to transmit to a UE, the base station could time-division-multiplex the data into multiple data streams, the base station could modulate the data streams onto the same PRBs as each other, and the base station could output the modulated data streams onto separate antenna ports for concurrent transmission on separate respective propagation paths to the UE. In practice, the UE could have two or more antennas, and the UE could estimate the channel distortion at each of its antennas and use the estimates to separately compute and uncover each of the base station's transmit signals.

Further, MIMO can also be used in a "multi-user MIMO" (MU-MIMO) configuration to increase the data capacity of the air interface by allowing communications to multiple UEs to use the same air-interface resources as each other. For instance, a base station can modulate data streams destined to each of multiple UEs on the same PRBs as each other and can transmit the modulated data streams on a separate respective propagation paths for receipt by the UEs. To facilitate this, the base station could pre-code transmissions on each propagation path using weighted coefficients based on channel estimates from the UEs, in a manner that enables each UE to remove cross-talk and receive its intended data. Further, the base station could beamform the transmissions respectively to each UE to help physically distinguish the transmissions from each other. In theory, MU-MIMO could thus increase the data capacity of the air interface by allowing a base station to serve more UEs at a time without requiring additional air-interface resources.

In dense urban markets and other areas, wireless service providers may face a need to provide an increased extent of MIMO service. In particular, in such areas, a provider may serve a great many UEs or may otherwise need to support high aggregate throughput, but the provider may have limited available spectrum, such as a limited number of PRBs per timeslot. To help overcome that limitation, the provider may equip its base stations with a massive-MIMO antenna array.

While a traditional MIMO antenna array may include on the order of 2 to 8 antennas, a massive-MIMO antenna array would include many more antennas, perhaps on the order of tens, hundreds, or even thousands of antennas. For instance, a representative massive-MIMO antenna array could include 128 antennas, of which 64 might be configured as transmit antennas and the other 64 might be configured as receive antennas. With this arrangement, if 4 transmit antennas are used per layer (e.g., to facilitate beamforming), the massive-MIMO antenna array might support on the order of 16 layers, to facilitate concurrent transmissions to up to 16 UEs (e.g., 8 UEs with 2 layers apiece, or 16 UEs with 1 layer apiece) or transmission to a single UE with up to 16 layers, among other possibilities.

When a base station serves many UEs at once, the base station could beneficially apply MU-MIMO in order to provide concurrent high-throughput transmissions to the UEs. For example, if the base station's air interface has 100 PRBs per timeslot and the base station has a massive-MIMO array as discussed above, then, with MU-MIMO, the base station could theoretically transmit concurrently to 8 UEs with 2 layers apiece on all 100 of those PRBs. Within one timeslot, each UE could thus theoretically receive two times the single-layer data capacity of those 100 PRBs. (By comparison, if instead of applying MU-MIMO, the base station were to apply just SU-MIMO with 2 layers apiece for each of those 8 UEs, then the base station might transmit to each UE with 2 layers on just about 12 PRBs, thus not providing as much of a throughput increase.)

To facilitate MU-MIMO service, the UEs that will share air-interface resources (e.g., PRBs) should be "orthogonal" to each other, meaning that each UE could receive spatially separate transmissions from the base station without undue interference from the base station's transmissions to each other UE. Thus, when a base station is going to apply MU-MIMO service (perhaps in response to the base station being heavily loaded with connected UEs with high throughput requirements), the base station could select a group of UEs to be a MU-MIMO group based on the UEs being orthogonal to each other.

Considering that MU-MIMO involves transmission of spatially separate beams to the UEs of the MU-MIMO group, the base station could base its grouping of UEs on a determination that transmissions to the UEs of the group would have sufficient angular separation from each other. For instance, the base station could determine an angle of arrival of uplink transmissions respectively from each of the base station's served UEs (e.g., based on phases of the transmissions arriving at multiple receive antennas at the base station), and the base station could select UEs to group as a MU-MIMO group based on the selected UEs having threshold different angles of arrival than each other. Further, the base station could additionally base the grouping of UEs on a determination that each UE of the group has reported threshold high quality coverage (e.g., strong receive power and/or signal-to-noise ratio)—as high quality coverage may make it easier for a UE to receive intended downlink transmissions.

When a base station serves multiple UEs at once, the base station may serve the various UEs on different carriers than each other, and if the base station serves UEs with carrier aggregation, the base station may serve the UEs on different combinations of carriers than each other. For instance, some of the UEs might initially connect with the base station on one carrier as their primary carrier while other UEs might initially connect with the base station on another carrier as their primary carrier. Further, for each served UE, the base station may or may not add one or more secondary carriers to the UE's connection, and the base station may add different secondary carriers to various UEs' connections.

As long as two or more UEs are served on at least one common carrier, those UEs could be grouped together for MU-MIMO service assuming the UE's are sufficiently orthogonal to each other.

For example, if a base station serves UE1 on carrier A as primary carrier and carrier B as secondary carrier and the base station serves UE2 on just carrier A as primary carrier, the base station could group UE1 and UE2 together for MU-MIMO service on carrier A assuming that UE1 and UE2 are sufficiently orthogonal to each other. The base station could thus provide UE1 and UE2 with MU-MIMO service on carrier A, using the same time-frequency resources (e.g., PRBs) on carrier A for communication to both UE1 and UE2.

Likewise, if a base station serves UE1 on carrier A as primary carrier and carrier B as secondary carrier and the base station serves UE2 on just carrier B as primary carrier, the base station could group UE1 and UE2 together for MU-MIMO service on carrier B assuming UE1 and UE2 are sufficiently orthogonal to each other. The base station could thus provide UE1 and UE2 with MU-MIMO service on carrier B, using the same time-frequency resources (e.g., PRBs) on carrier B for communication to both UE1 and UE2.

And as another example, if a base station serves UE1 on carrier A as primary carrier and carrier B as secondary carrier and the base station serves UE2 on carrier B as primary carrier and carrier A as secondary carrier, the base station could likewise group UE1 and UE2 together for MU-MIMO service on both carriers A and B, assuming UE1 and UE2 are sufficiently orthogonal to each other. The base station could thus provide UE1 and UE2 with MU-MIMO service on carrier A, using the same time-frequency resources (e.g., PRBs) on carrier A for communication to both UE1 and UE2. And the base station could also provide UE1 and UE2 with MU-MIMO service on carrier B, using the same time-frequency resources (e.g., PRBs) on carrier B for communication to both UE1 and UE2.

Unfortunately, however, a problem could arise in grouping UEs together with each other for MU-MIMO service if the UEs are not each served on the same primary carrier as each other (with or without carrier aggregation). The problem arises in the representation scenario where communication between the base station and a UE is bi-directional on the UE's primary carrier but communication between the base station and the UE is downlink-only on any secondary on which the base station is concurrently serving the UE—or at least where the UE does not transmit to the base station on any such secondary carrier a signal that the base station can use to determine the UE's angle of arrival.

In that scenario, if the base station is serving UE1 with carrier aggregation on carrier A as primary carrier and carrier B as secondary carrier, and if the base station is considering establishing a MU-MIMO group of UE1 together with UE2 that the base station is serving on carrier B as a primary carrier and carrier A as secondary carrier, then base station would determine each UE's respective angle of arrival on a different respective carrier. Namely, the base station would determine UE1's angle of arrival based on signaling from UE1 on carrier A, and the base station would determine UE2's angle of arrival based on signaling from UE2 on carrier B.

Due to possible differences in refraction on different carriers, a comparison of those angles of arrival for purposes of determining whether UE1 and UE2 are threshold angularly separated from each other could be flawed. Therefore, the base station might not accurately enough determine whether UE1 and UE2 are threshold angularly separated from each other, and so the base station's determination of whether UE1 and UE2 are sufficiently orthogonal to each other to facilitate MU-MIMO with a desired level of spectral efficiency may be in error.

Disclosed herein is a mechanism to help address this issue.

In accordance with the disclosure, when a base station is serving a plurality of UEs on a common carrier (i.e., at least one carrier on which the base station is serving each of the UEs of the plurality) and the base station is considering which subset of the UEs to group together with each other for MU-MIMO service, the base station will base the grouping of UEs together on a determination that the base station is serving the UEs of the subset on a common primary carrier (i.e., each UE of the subset having the same carrier as their primary carrier). Alternatively, when faced with a choice of which subset of UEs to group together with each other for MU-MIMO service, the base station will give priority to UEs that the base station is serving on a common primary carrier.

By grouping together UEs for MU-MIMO service based on their having the same primary carrier as each other, the base station can help to optimize the determination that the UEs being grouped together are threshold angularly separated from each other. Thus, the base station can help to optimize spectral efficiency of the MU-MIMO service.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Figure 1:
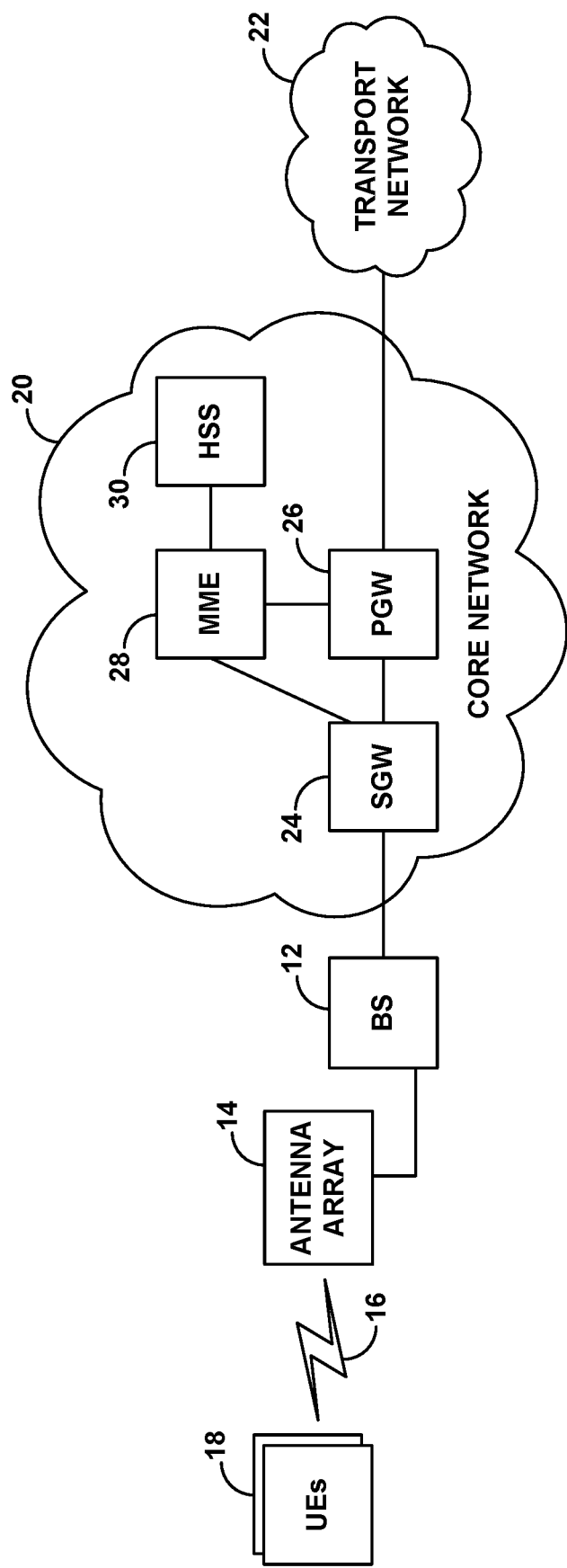
FIG. 1 is a simplified block diagram of a network arrangement in which aspects of the present disclosure can be implemented.

Referring to the drawings, as noted above, FIG. 1 is a simplified block diagram of an example wireless communication system in which various disclosed features can be implemented. It should be understood, however, that numerous variations from this and other disclosed arrangements and operations are possible. For example, elements or operations could be added, removed, combined, distributed, re-ordered, or otherwise modified. In addition, operations described as being performed by one or more entities could be implemented in various ways, such as by a processor executing instructions stored in non-transitory data storage, along with associated circuitry or other hardware, for instance.

As shown in FIG. 1, the example wireless communication system includes a representative base station 12 having an antenna array 14 through which the base station is configured to provide coverage 16 on multiple carriers in one or more frequency bands. Shown operating within coverage of the base station are then a plurality of UEs 18, which could be devices of the type discussed above, among other possibilities.

The base station could be a macro base station of the type configured to provide a wide range of coverage, and the antenna array could be mounted on a tower or other tall structure. Alternatively, the base station could take other forms, such as a small cell base station, a repeater, a femtocell base station, or the like, which might be configured to provide a smaller range of coverage. The base station could be configured to operate according to a 4G, 5G, or other radio access technology. For instance, the base station could be an LTE evolved Node-B (eNB) or a 5GNR gigabit Node-B (gNB), among other possibilities.

The base station is shown coupled with a core network 20, which could be an enhanced packet core (EPC) network, a next generation core (NGC) network, or another network including components supporting an applicable radio access technology and providing connectivity with at least one transport network 22, such as the Internet.

In an example implementation as shown, the core network 20 includes a serving gateway (SGW) 24, a packet data network gateway (PGW) 26, a mobility management entity (MME) 28, and a home subscriber server (HSS) 30. In particular, the base station has an interface with the SGW, the SGW has an interface with the PGW, and the PGW provides connectivity with the transport network. Further, the base station has an interface with the MME, and the MME has interfaces with the SGW and the HSS.

With this arrangement, the SGW and PGW cooperatively provide user-plane connectivity between the base station and the transport network, to enable a UE served by the base station to engage in communication on the transport network. And the MME operates as a controller to carry out operations such as coordinating UE attachment and setup of user-plane bearers. Further, the HSS includes or has access to a data store containing UE capabilities and service profile data and can work with the MME to facilitate UE authentication.

As discussed above, the air interface between the base station and UEs within its coverage could be structured to define various air interface resources.

For instance, in the time domain, the air interface could define a continuum of 10-millisecond (ms) frames, each divided into ten 1-ms subframes, and each subframe could be further divided into a number of timeslots, each additionally divided into symbol time segments. And in the frequency domain, the bandwidth of each carrier on which the base station operates could be divided into subcarriers with specified subcarrier spacing on the order of 15 to 240 kHz. With this arrangement, the air interface on each carrier would define an array of resource elements each occupying a subcarrier and symbol time segment, and the base station and UEs could communicate with each other through modulation of the subcarriers to carry data in those resource elements. Variations of this arrangement are possible as well.

Further, particular groupings of resource elements on the air interface could be grouped together to define the PRBs discussed above. In an example implementation, each PRB could span one timeslot in the time domain and a group of subcarriers in the frequency domain. Depending on the carrier bandwidth, the air interface could thus support a certain number of such PRBs across the bandwidth of the carrier within each timeslot.

In addition, certain resource elements on the downlink and uplink could be reserved for particular control-channel or shared-channel communications.

For instance, on the downlink, certain resource elements per subframe (or per downlink subframe in TDD) could be reserved to define a downlink control region for carrying control signaling such as scheduling directives and acknowledgements from the base station to UEs. And other resource elements per subframe could be reserved to define a shared channel in which PRBs could carry scheduled data communications from the base station to UEs.

Further, in certain subframes, a group of resource elements centered on the center frequency of each carrier could be reserved to carry synchronization signals that UEs could detect as a way to discover coverage of the base station on the carrier and to establish frame timing. And in certain subframes, a group of resource elements also centered on the center frequency of the carrier could be reserved to define a broadcast-channel for carrying system information messages, such as master information block (MIB) and system information block (SIB) messages that WCDs could read to obtain operational parameters such as carrier bandwidth and other information. Further, certain resource elements distributed in a predefined pattern throughout the carrier bandwidth per subframe could be reserved to carry reference signals that UEs could measure as a basis to evaluate coverage strength and quality and to provide channel estimates to facilitate precoding, beamforming, or the like.

On the uplink, on the other hand, certain resource elements per subframe (or per uplink subframe in TDD) could be reserved to define an uplink control region for carrying control signaling such as access requests, channel-quality reports, scheduling requests, and acknowledgements, from UEs to the base station. And other resource elements per subframe could be reserved to define a shared channel in which PRBs could carry scheduled data communications from UEs to the base station. Further, still other resources on the uplink could be reserved for other purposes as well. For instance, certain resource elements on the uplink could be assigned on a per-UE basis to carry a sounding reference signal (SRS) from the UE to the base station, which the base station could use as a basis to determine the UE's angle of arrival.

In operation, when a UE enters into coverage of the base station, the UE could detect the base station's synchronization signal and could then read the base station's MIB or the like to determine the carrier's bandwidth, and the UE could evaluate the base station's reference signal on that carrier to determine that coverage is strong enough to support a connection. The UE could then engage in random access signaling and Radio Resource Control (RRC) configuration signaling with the base station to connect with the base station on the carrier, thus putting the UE in an RRC-connected mode.

Once the UE is connected with the base station, the UE could then transmit to the base station an attach request, which the base station could forward to the MME for processing. And after working with the HSS to authenticate the UE, the MME could coordinate setup for the UE of one or more user-plane bearers between the base station and the PGW, to enable the UE to engage in communication on the transport network. Further, the base station could establish for the UE a context record indicating operational state of the UE, including an indication of the carrier on which the UE is connected—the UE's primary carrier—and the base station could receive from the UE and/or the HSS (via the MME) a set of capabilities and profile data for the UE and could store that data in the context record for reference while serving the UE.

The base station could then serve the UE with data communications on the UE's primary carrier.

For instance, when data arrives at the base station for transmission to the UE, the base station could allocate one or more downlink PRBs in a subframe for use to transmit at least a portion of the data, defining a transport block, to the UE. The base station could then transmit to the UE in the control region of that subframe a Downlink Control Information (DCI) message that designates the PRBs, and the base station could accordingly transmit the transport block to the UE in those designated PRBs.

And when the UE has data to transmit to the base station (e.g., for transmission on the transport network), the UE could transmit to the base station a scheduling request that carries with it a buffer status report (BSR) indicating how much data the UE has buffered for transmission. And in response the base station, could allocate one or more uplink PRBs in an upcoming subframe for carrying a transport block of that data from the UE and could transmit to the UE a DCI message that designates those upcoming PRBs. The UE could then accordingly transmit the transport block to the base station in the designated PRBs.

While the base station is so serving a connected UE, the UE could also transmit various operational information to the base station to assist with the base station's allocation of PRBs and other service of the UE.

By way of example, the UE could regularly evaluate and report the quality of its coverage from the base station, and the base station could use the UE's reported coverage quality as a basis to configure air interface transmission and/or for other purposes. For instance, the UE could regularly evaluate channel quality based on signal-to-interference-plus-noise ratio (SINR) and could periodically report to the base station a channel-quality-indicator (CQI) value that represents the determined level of quality. And the base station could use the UE's latest reported CQI value as a basis to configure a modulation and coding scheme for use in air interface communication between the base station and the UE. Further, the UE could regularly evaluate and report reference signal receive quality (RSRQ), and the base station could use the reported RSRQ to control UE mobility or for other purposes.

In addition, initially upon UE connection or subsequently while the base station is serving the UE on a primary carrier, the base station could invoke carrier aggregation service of the UE. Various triggers could exist for invoking carrier aggregation. For instance, the base station could determine that the UE needs to receive higher throughput or could benefit from having transmissions distributed across multiple different carriers.

To invoke carrier aggregation service of a UE, the base station could engage in RRC signaling with the UE to cause the UE to scan for and report threshold strong coverage of the base station on one or more other carriers, and upon reporting from the UE, the base station could add one or more such carriers to the UE's RRC connection as secondary carrier(s). To add each such secondary carrier, the base station could engage in RRC signaling with the UE to notify the UE that the carrier is added as a secondary carrier (e.g., designating the carrier with an index that signifies it is a secondary carrier for the UE rather than a primary carrier for the UE), and the base station could accordingly update the UE's context record.

The base station could then provide the UE with carrier-aggregation service. In particular, when the base station has data for transmission to the UE, the base station could allocate one or more downlink PRBs in the UE's primary carrier and one or more PRBs in each of the UE's secondary carriers to cooperatively carry a transport block of the data to the UE. And the base station could transmit to the UE a DCI message that designates the PRBs and could accordingly transmit the transport block to the UE in the designated PRBs, i.e., distributed across the UE's primary carrier and secondary carrier(s).

In practice, the base station may serve multiple connected UEs at a time on the base station's various carriers, and the base station may face a need to schedule data transmissions concurrently to multiple such UEs and/or from multiple such UEs. Because the base station's air interface on each carrier has just a finite, limited number of PRBs per unit time (e.g., per subframe), the base station could implement a scheduling algorithm in an effort to fairly and appropriately allocate the PRBs among the base station's served UEs.

Yet as noted above, the base station may still face load issues. For instance, there could be times when the base station is serving many connected UEs at once on a given carrier and faces a need to schedule data transmissions to many such UEs at once, but the base station does not have sufficient PRBs per unit time on the carrier to adequately meet the throughput needs of the UEs.

As noted above, the base station could use MIMO to help overcome this problem. In particular, the base station could apply MU-MIMO on a carrier to facilitate serving multiple UEs at once on the same PRBs of the carrier as each other and may thereby be able to provide the multiple UEs with a desired level of throughput on the carrier while also achieving improved spectral efficiency. As further noted above, one way to provide such MIMO service is with use of a massive-MIMO antenna array. Thus, in an example implementation, the base station's antenna array 14 could be a massive-MIMO array.

Figure 2:
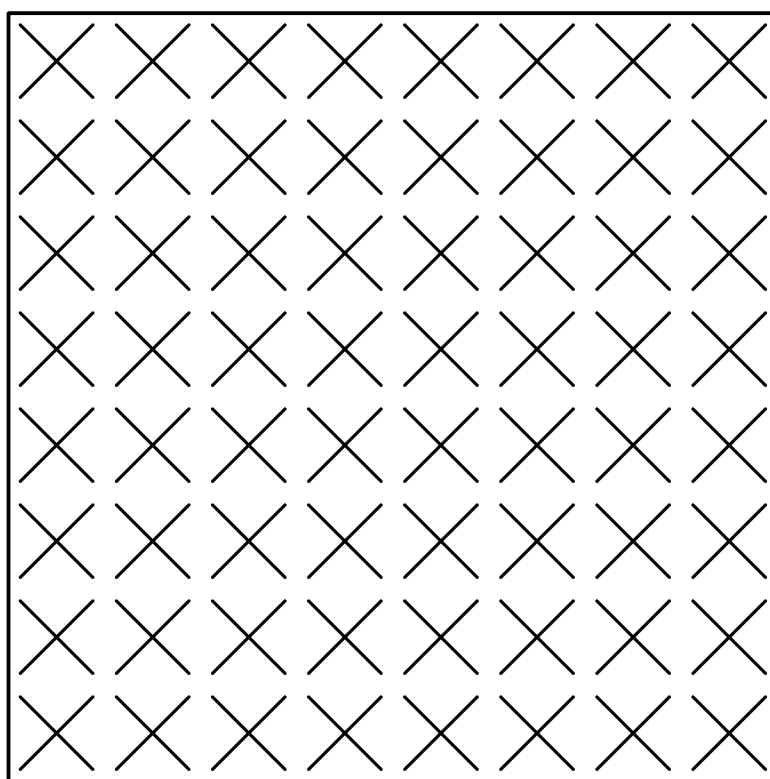
FIG. 2 is a simplified diagram of an example massive-MIMO antenna array that could be implemented according to the disclosure.

FIG. 2 is a simplified diagram of an example massive-MIMO array that could be implemented at base station 12. In this illustration, each X represents two antennas (or antenna elements), one with positive polarization and one with negative polarization. As a result, each column in the example array includes eight antennas with positive polarization and eight antennas with negative polarization. As there are eight columns of antennas, the massive-MIMO array thus has a total of 128 antennas. In a representative implementation, 64 of these antennas could be configured as transmit (downlink) antennas, and the other 64 could be configured as receive (uplink) antennas. For instance, all of the antennas with positive polarization could be configured as transmit antennas, and all of the antennas with negative polarization could be configured as receive antennas.

As discussed above, with this massive-MIMO antenna array, the base station may be able to provide 16 layers of MIMO transmission. For instance, for each layer, the base station could use 4 of its transmit antennas to provide beamformed transmission defining a respective MIMO layer. Thus, the base station could in theory transmit with up to 16 layers on a common set of air interface resources (e.g., PRBs). Other MIMO arrangements are possible as well.

As noted, the base station could transmit individual MIMO layers to UEs, by beamforming and pre-coding the transmissions. For example, the base station could beamform transmissions to an individual UE by evaluating angle of arrival of uplink signals (e.g., uplink SRS) from the UE and setting phase and amplitude of downlink transmission from various antenna elements so as to direct the transmission toward the UE. Further, the base station could pre-code individual transmissions to a UE to help the UE distinguish those transmissions from others and extract the transmissions from a combination of received downlink signals if applicable. For instance, the base station could transmit one or more downlink modulation reference signals (DMRSs) that the UE can receive and evaluate in order to establish and report channel estimates, and the base station could use those channel estimates as a basis to pre-code transmissions with weighted coefficients that enable the UE to receive and uncover the transmissions.

Assuming sufficient orthogonality between UEs of a group, the base station could thus transmit to the UEs of the group on the same PRBs as each other, i.e., at the same time and on the same subcarriers as each other. The transmissions to the UEs would occupy the same PRBs as each other, but could be spatially distinguished from each other through beamforming and could be further distinguished by pre-coding and/or one or more other mechanisms.

Thus, in each downlink subframe on the carrier, the base station could allocate a given set of PRBs to each of multiple UEs of a MU-MIMO group and could provide downlink transmission on the allocated PRB(s) respectively to each UE of the MU-MIMO group, using one or more MIMO layers respectively for each UE.

The base station could thus theoretically allocate all of the carrier's PRBs of a subframe to the MU-MIMO group, so that each UE of the MU-MIMO group can receive data transmissions on one or more MIMO layers within all of those PRBs of the carrier. Alternatively, the base station might allocate some of the carrier's PRBs of the subframe to a first MU-MIMO group of UEs and transmit to those UEs with MIMO layers on those PRBs, and the base station might allocate other of the carrier's PRBs of the subframe to a second MU-MIMO group of UEs and transmit to those UEs with MIMO layers on those PRBs. Further, the base station might allocate some of the carrier's PRBs of the subframe for use without MIMO or in other ways.

To configure MU-MIMO service for a UE, the base station may engage in signaling with the UE to obtain channel estimates and precoding information, and the base station may work with the UE through DCI signaling to prepare the UE for receipt of beamformed and pre-coded transmissions or the like.

Further, the base station could be providing one or more of the UEs of the MU-MIMO group with carrier aggregation service as well. In particular, each of one or more of the UEs might have multiple carriers included in the UE's RRC connection, including a primary carrier and one or more secondary carriers. And the UE might be in a MU-MIMO group respectively on one or more of the carriers on which the UE is being served. For instance, the base station might be serving UE1 on carrier A as primary carrier and carrier B as secondary carrier, and UE1 might be grouped with UE2 for MU-MIMO service on carrier A, among other possibilities.

As discussed above, at issue in this process could be which UEs the base station should group together for MU-MIMO service, i.e., to be served with communications on the same air-interface resources (e.g., PRBs) as each other. The base station may face this issue when the base station is heavily loaded, such as with a threshold high number of connected UEs, and when the served UEs could benefit from MU-MIMO service.

In practice, the base station could address this question per downlink subframe. For instance, in anticipation of each downlink subframe, the base station could determine for which of its connected-mode UEs the base station has data buffered for downlink transmission, how soon the data needs to be transmitted, and how many UEs are at issue. Further, the base station could consider its air-interface capacity in the subframe, such as how many PRBs are available (e.g., on a per carrier basis) for the base station to allocate in the subframe. And based on these and/or other factors, the base station could determine that applying MU-MIMO for transmission in the subframe could be helpful, and the base station could then work to determine which of the UEs the base station should group together for MU-MIMO service. Alternatively, the base station could engage in MU-MIMO grouping at other times and/or in response to other triggers.

As noted above, the base station could group UEs together for MU-MIMO service with the grouping being based on a consideration of whether the UEs of the group have the same carrier as their primary carrier.

In particular, the base station's analysis could begin by identifying a candidate group of UEs based on the UEs of the candidate group being served on at least one common carrier. And the base station could decide whether to group the candidate group of UEs together with each other for MU-MIMO service. with the decision being based on whether the UEs of the candidate group have the same primary carrier as each other. If the UEs of the candidate group have the same primary carrier as each other, then, based at least on that factor, the base station could decide to group the UEs together with each other for MU-MIMO service. Whereas, if the UEs of the candidate group do not have the same primary carrier as each other, then, based at least on that factor, the base station could decide to not group the UEs together with each other for MU-MIMO service.

These two steps could be functionally rolled into one, with the base station selecting UEs to group together with each other for MU-MIMO service based on a determination that (i) the UEs of the group have at least one serving carrier in common and (ii) the UEs of the group have the same primary carrier as each other—as one of the at least one serving carrier that they have in common.

As an example of this, consider a scenario where the base station is serving (i) UE1 on carrier A as primary carrier and carrier B as secondary carrier and (ii) UE2 on carrier A as primary carrier without carrier aggregation. In that scenario, the base station could decide to group UE1 and UE2 together with each other for MU-MIMO service, with the decision being based on UE1 and UE2 both operating on the same primary carrier—carrier A. As discussed above, in that situation, the base station could determine the angle of arrival respectively of each UE on carrier A, and assuming that the base station determines the UEs' determined angles of arrival to be threshold separate, the base station could reliably group the UEs together for MU-MIMO service on carrier A, while also continuing to serve UE1 on carrier B in combination with carrier A.

As another example, consider a scenario where the base station is serving (i) UE1 on carrier A as primary carrier and carrier B as secondary carrier and (ii) UE2 on carrier B as primary carrier and carrier A as secondary carrier (i.e., the opposite of UE1). In that scenario, the base station might consider grouping UE1 and UE2 together for MU-MIMO service based on the fact that both UEs are being served on carrier A and/or the fact that both UEs are being served on carrier B. But the base station may decide to not group UE1 and UE2 together based at least on the fact that UE1 and UE2 have different primary carriers—since UE1 has carrier A as primary carrier and UE2 has carrier B as primary carrier. As discussed above, in that situation, the base station would be determining the angle of arrival of UE1 on carrier A and the angle of arrival of UE2 on carrier B, and differences in refraction between transmissions on those two carriers might make throw into question a comparison of those determined angles of arrival.

In another respect as noted above, when the base station is considering which of its served UEs to group together for MU-MIMO service, the base station could give higher priority to pairing of UEs that have the same primary carrier as each other than to UEs that have different primary carriers than each other.

As an example of this, consider a scenario where (i) the base station is serving UE1 on carrier A as primary carrier and carrier B as secondary carrier, (ii) the base station is serving UE2 on carrier A as primary carrier and carrier B as secondary carrier, and (iii) the base station is serving UE3 on carrier B as primary carrier and carrier A as secondary carrier. And assume that the base station will group together just two of those UEs, perhaps due to limitations on MIMO layer resources.

In that scenario, the base station could potentially group together (i) UE1 and UE2 for MU-MIMO service on carrier A and carrier B or (ii) UE1 and UE3 for MU-MIMO service on carrier A and carrier B. And per the present disclosure, the base station could give higher priority to grouping together UE1 with UE2 than to grouping of UE1 with UE3, since UE1 and UE2 have the same primary carrier as each other, whereas UE1 and UE3 have different primary carriers. Thus, given these three UEs that could be grouped together, the base station may decide to group together UE1 and UE2 rather than grouping together UE1 and UE3. Whereas, if the base station has sufficient MIMO resources and no higher priority grouping possibilities, the base station might group all three of these UEs together for MU-MIMO service.

Note that, in this example, the base station could thus decide to group together UE1 and UE2 for MU-MIMO service on carrier A and on carrier B, based on a determination of orthogonality established by comparison of the UEs' respective angles of arrival on carrier A. Comparing the UEs' respective angles of arrival on the same carrier may provide a more certain basis for establishing orthogonality than comparing the UEs' respective angles of arrival on different carriers. Once that orthogonality is established, the base station could then more safely (e.g., with higher likelihood of success) group the UEs together for MU-MIMO service on carrier A. And the base station could likewise then safely group the UEs together for MU-MIMO service on carrier B, even though their orthogonality was determined based on their angles of arrival on carrier A.

As another example, consider a scenario where the base station is serving (i) UE1 on carrier A as primary carrier and on carrier B as secondary carrier, (ii) UE2 on carrier A as primary carrier without carrier aggregation, and (iii) UE3 on carrier B as primary carrier without carrier aggregation.

In that scenario, the base station could potentially group together (i) UE1 and UE2 for MU-MIMO service on carrier A or (ii) UE1 and UE2 for MU-MIMO service on carrier B. And per the present disclosure, the base station could give higher priority to grouping together UE1 with UE2 than to grouping of UE1 with UE3, since UE1 and UE2 have the same primary carrier as each other, whereas UE1 and UE3 have different primary carriers. Thus, given these three UEs that could be grouped together, the base station may decide to group together UE1 and UE2 rather than grouping together UE1 and UE3. (Further, given sufficient available resources, in theory the base station could group UE1 and UE2 together for MU-MIMO service on carrier A while also grouping together UE1 and UE3 for carrier aggregation service on carrier B.)

Figure 3:
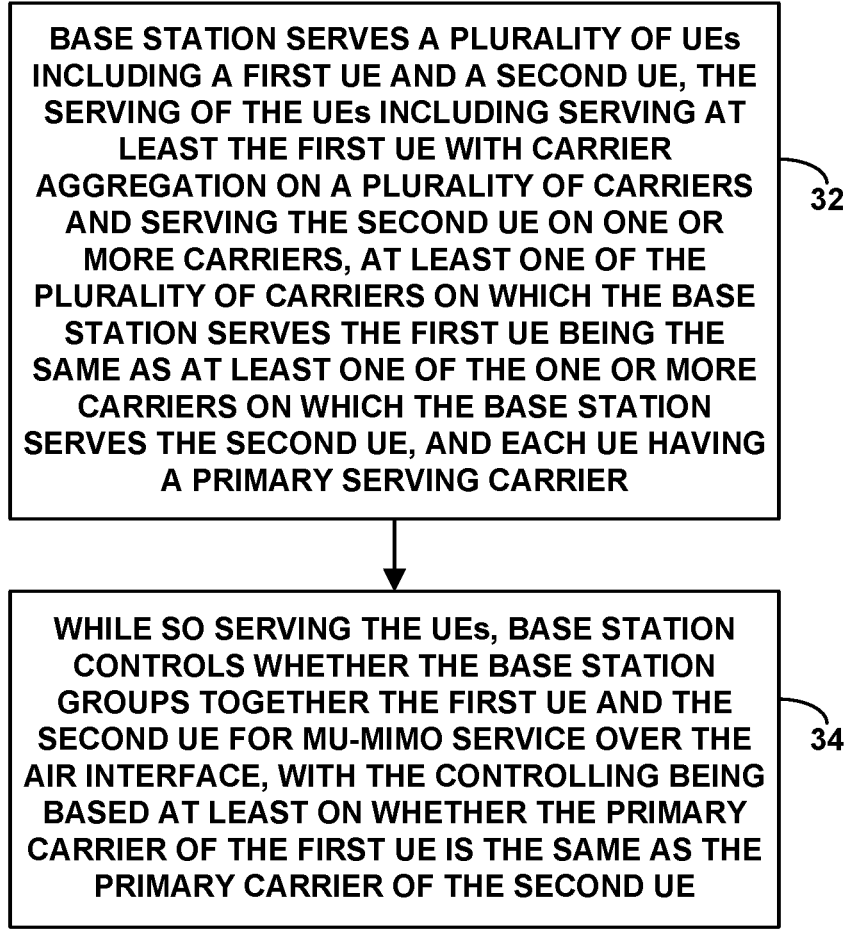
FIG. 3 is a flow chart depicting operations that can be carried out in accordance with the disclosure.

FIG. 3 is a flow chart depicting a method that can be carried out in accordance with this disclosure, to control service over an air interface in a wireless communication system.

As shown in FIG. 3, at block 32, the method includes the base station serving a plurality of UEs including a first UE and a second UE, where the serving of the UEs includes serving at least the first UE with carrier aggregation on a plurality of carriers and serving the second UE on one or more carriers, with at least one of the plurality of carriers on which the base station serves the first UE being the same as at least one of the one or more carriers on which the base station serves the second UE, and with each UE having a primary serving carrier.

In an example implementation, for instance, the base station could be serving the first UE with carrier aggregation on a primary carrier and one or more secondary carriers while serving the second UE on a primary carrier that is the same as one of the carriers on which the base station is serving the first UE. Or the base station could be serving the first UE with carrier aggregation on a primary carrier and one or more secondary carriers while also serving the second UE with carrier aggregation on a primary carrier and one or more secondary carriers, with at least one of the first UE's serving carriers (a carrier on which the base station is serving the UE) being the same as one of the second UE's serving carriers. Other arrangements are possible as well.

At block 34, the method further includes, while the base station is serving the UEs in that manner, the base station controlling whether the base station groups together the first UE and the second UE for MU-MIMO service over the air interface, with the controlling being based at least on whether the primary carrier of the first UE is the same as the primary carrier of the second UE, and perhaps further on a determination of whether beam direction from the base station to the first UE will be threshold different than beam direction from the base station to the second UE.

In line with the discussion above, the controlling could involve (i) making a determination of whether the first UE and second UE have the same primary serving carrier as each other, (ii) if the determination is that the first UE and second UE have the same primary serving carrier as each other, then, based at least in part on the determination, the base station grouping together the first UE and second UE for MU-MIMO service over the air interface, and (iii) if the determination is that the first UE and second UE do not have the same primary serving carrier as each other, then, based at least in part on the determination, the base station not grouping together the first UE and second UE for MU-MIMO service over the air interface.

Further, the act of grouping together the first UE and second UE for MU-MIMO service over the air interface while serving the first UE and second UE could involve configuring air interface transmission between the base station and the first UE to occupy same time-frequency air interface resources as air interface transmission between the base station and the second UE. And the act of not grouping together the first UE and second UE for MU-MIMO service over the air interface while serving the first UE and second UE could involve configuring air transmission between the base station and the first UE to occupy different time-frequency air interface resources than air interface transmission between the base station and the second UE.

In an example implementation, the controlling could include making a determination that the primary serving carrier of the second UE is the same as a secondary serving carrier of the first UE rather than being the same as the primary serving carrier of the first UE and, based at least on that determination, the base station not grouping together the first UE and second UE for MU-MIMO service over the air interface.

Further, in an example implementation where the base station also serves the second UE with carrier aggregation on a plurality of carriers, the controlling could include making a determination that the primary serving carrier of the first UE is the same as a secondary serving carrier of the second UE rather than being the same as the primary serving carrier of the second UE and, based at least on the determination, the base station not grouping together the first UE and the second UE for MU-MIMO service over the air interface.

Alternatively, in an example implementation where the base station also serves the second UE with carrier aggregation on a plurality of carriers, the controlling could include making a determination the primary serving carrier of the first UE is the same as the primary serving carrier of the second UE and, based at least on that determination, the base station grouping together the first UE and the second UE for MU-MIMO service over the air interface.

Figure 4:
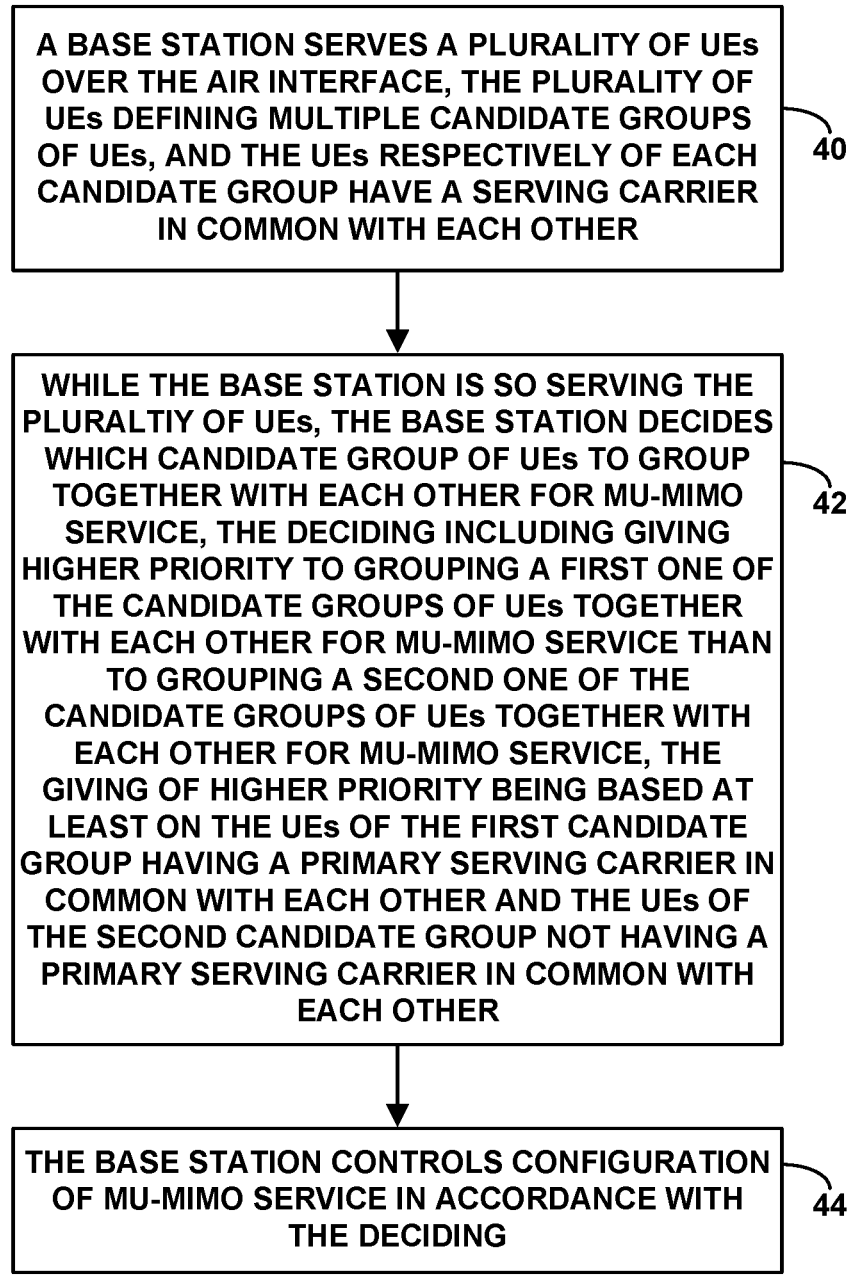
FIG. 4 is another flow chart depicting operations that can be carried out in accordance with the disclosure.

FIG. 4 is next another flow chart depicting a method that can be carried out in accordance with this disclosure, to control service over an air interface in a wireless communication system. As discussed above, the air interface could define a continuum of subframes, and this method could be carried out on a per-subframe basis. Further, various features described above could be incorporated in the context of this method and vice versa.

As shown in FIG. 4, at block 40, the method includes the base station serving a plurality of UEs over the air interface, the plurality of UEs defining multiple candidate groups of UEs (i.e., there being multiple possible groups of UEs among the plurality of UEs), and the UEs respectively of each candidate group have a serving carrier in common with each other.

At block 42, the method includes, while the base station is so serving the UEs, the base station deciding which candidate group of UEs to group together with each other for MU-MIMO service (as one of one or more MU-MIMO groups that the base station will establish), the deciding including giving higher priority to grouping a first one of the candidate groups of UEs together with each other for MU-MIMO service than to grouping a second one of the candidate groups of UEs together with each other for MU-MIMO service, the giving of higher priority being based at least on the UEs of the first candidate group having a primary serving carrier in common with each other and the UEs of the second candidate group not having a primary serving carrier in common with each other.

And at block 44, the method includes the base station controlling configuration of MU-MIMO service in accordance with the deciding.

In line with the discussion above, the act of the base station deciding which candidate group of UEs to group together for MU-MIMO service could include, based at least on the giving of higher priority to grouping the first candidate group of UEs together with each other or MU-MIMO service than to grouping the second candidate group of UEs together with each other for MU-MIMO service, the base station deciding to group the first candidate group of UEs together with each other for MU-MIMO service rather than to group the second candidate group of UEs together with each other for MU-MIMO service.

Further, the act of deciding to group the first candidate group of UEs together with each other for MU-MIMO service could be further based on a determination that beam direction from the base station to each UE of the first candidate group will be threshold different than beam direction respectively from the base station to each other UE of the first candidate group.

The act of the base station controlling the configuration of MU-MIMO service in accordance with the deciding could then involve the base station grouping the first candidate group of UEs together with each other for MU-MIMO service rather than grouping the second candidate group of UEs together with each other for MU-MIMO service. And grouping the first candidate group of UEs together with each other for MU-MIMO service could involve configuring air interface transmission between the base station and each UE of the first candidate group to occupy same time-frequency air interface resources as air interface transmission between the base station and each other UE of the first candidate group.

Further, in an example implementation as discussed above, the method could involve the base station determining that the UEs of the first candidate group have a common primary serving carrier and that the UEs of the second candidate group do not have a common primary carrier and (ii) responsive to that determination, the base station giving the higher priority to grouping the first candidate group of UEs together with each other for MU-MIMO service than to grouping the second candidate group of UEs together with each other for MU-MIMO service.

Figure 5:
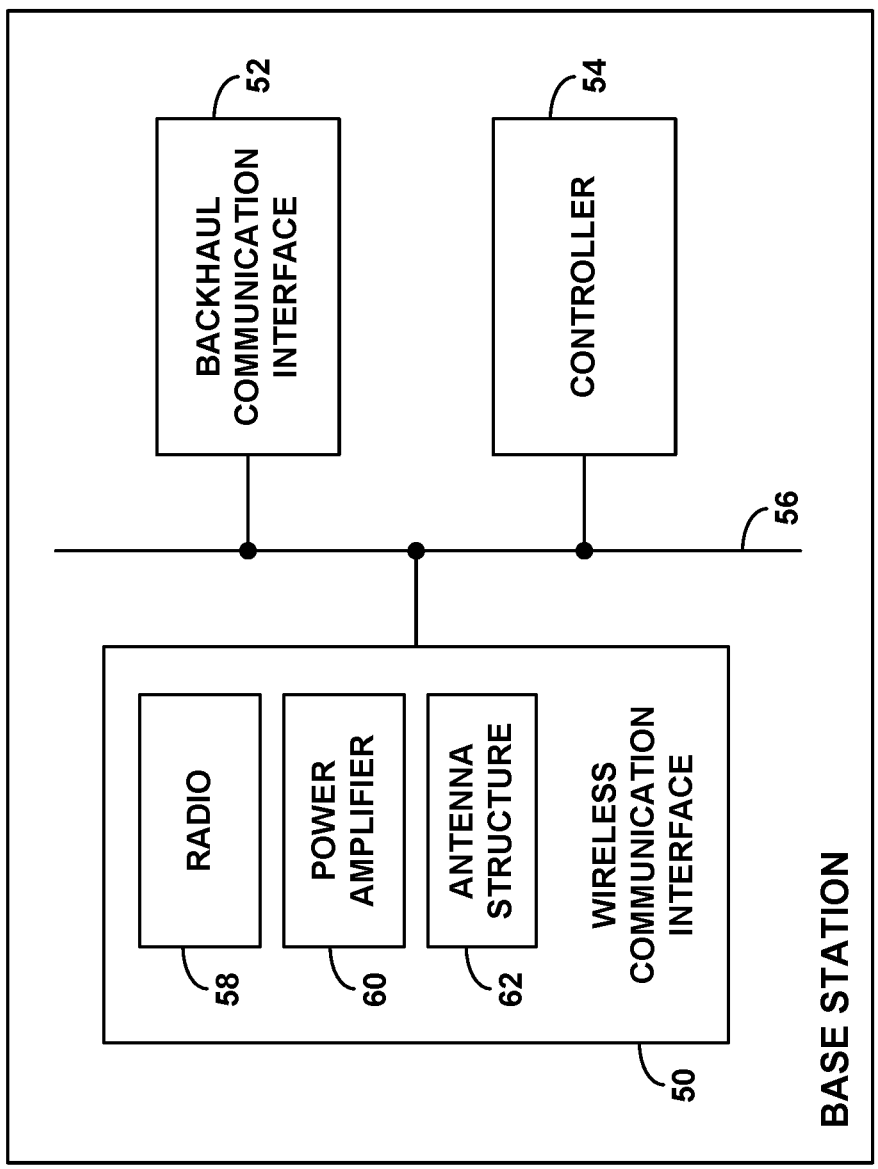
FIG. 5 is a simplified block diagram of a base station operable in accordance with the disclosure.

Finally, FIG. 5 is a simplified block diagram of an example base station that could operate in accordance with the present disclosure, to control service over an air interface in a wireless communication system.

As shown in FIG. 5, the example base station includes a wireless communication interface 50, a backhaul communication interface 52, and a controller 54, which could be integrated together and/or communicatively linked by a network, system bus, or other connection mechanism 56.

Wireless communication interface 50 includes a radio 58, a power amplifier 60, and antenna structure 62. The radio could operate to interface between encoded baseband signals and RF signals. The power amplifier could operate to amplify signals for transmission by the antenna structure 62. And the antenna structure 62 could comprise a plurality of antennas for communicating over the air interface, where the air interface defines physical channel resources for carrying data wirelessly from the base station to a plurality of UEs served by the base station. As discussed above, the antenna structure could comprise or otherwise define an antenna array, such as a massive-MIMO array for instance.

Backhaul communication interface 52 could be a network communication interface (e.g., an Ethernet network interface port and/or connection) through which the base station can communicate with various other network entities.

And controller 54, which could comprise a processing unit, data storage, and program instructions stored in the data storage and executable by the processing unit, or could take other forms, could be operable to cause the base station to carry out various operations as described herein.

For example, the controller could be configured to control whether the base station groups at least two of the UEs together with each other as a MU-MIMO group for MU-MIMO service over the air interface, with the controlling occurring when the base station is serving at least one of the at least two UEs with carrier aggregation on a plurality of carriers, and with the controlling being based at least on whether the at least two UEs have a primary serving carrier in common with each other. Further, the controlling could be additionally based on a determination that beam direction from the base station to each UE of the at least two UEs will be threshold different than beam direction respectively from the base station to each other UE of the at least two UEs.

In an example implementation, for instance, the controlling could involve (i) making a determination of whether the at least two UEs have the same primary serving carrier as each other, (ii) if the determination is that the at least two UEs have the same primary serving carrier as each other, then, based at least in part on the determination, causing the base station to group together the at least two UEs for MU-MIMO service over the air interface, and (iii) if the determination is that the at least two UEs do not have the same primary serving carrier as each other, then, based at least in part on the determination, causing the base station to not group together the at least two UEs for MU-MIMO service over the air interface.

As further discussed above, the act of grouping together the at least two UEs for MU-MIMO service over the air interface could involve configuring air interface transmission between the base station and each UE of the at least two UEs to occupy same time-frequency air interface resources as air interface transmission between the base station and each other UE of the at least two UEs.

And in an example implementation, the controlling could involve (i) making a determination that the primary serving carrier of a given one of the at least two UEs is the same as a secondary serving carrier of another one of the at least two UEs rather than being the same as the primary serving carrier of the other UE of the at least two UEs and (ii) based at least on the determination, causing the base station to not group together the at least two UEs for MU-MIMO service over the air interface.

Other aspects described above could be implemented in this context, and vice versa.

Exemplary embodiments have been described above. Those skilled in the art will understand, however, that changes and modifications may be made to these embodiments without departing from the true scope and spirit of the invention.

We claim:

1. A method for controlling service over an air interface in a wireless communication system, the method comprising:
    serving, by a base station, a plurality of user equipment devices (UEs) including a first UE and a second UE, wherein the serving of the UEs includes serving at least the first UE with carrier aggregation on a plurality of carriers and serving the second UE on one or more carriers, wherein at least one of the plurality of carriers on which the base station serves the first UE is the same as at least one of the one or more carriers on which the base station serves the second UE, and wherein each UE has a primary serving carrier; and
    while so serving the UEs, controlling by the base station whether the base station groups together the first UE and the second UE for Multi-User Multiple-Input-Multiple-Output (MU-MIMO) service over the air interface, the controlling being based at least on whether the primary serving carrier of the first UE is the same as the primary serving carrier of the second UE.

2. The method of claim 1, wherein the controlling is additionally based on a determination of whether beam direction from the base station to the first UE will be threshold different than beam direction from the base station to the second UE.

3. The method of claim 1, wherein the controlling includes:
    making a determination of whether the first UE and second UE have the same primary serving carrier as each other;
    if the determination is that the first UE and second UE have the same primary serving carrier as each other, then, based at least in part on the determination, the base station grouping together the first UE and second UE for MU-MIMO service over the air interface; and
    if the determination is that the first UE and second UE do not have the same primary serving carrier as each other, then, based at least in part on the determination, the base station not grouping together the first UE and second UE for MU-MIMO service over the air interface.

4. The method of claim 3,
    wherein grouping together the first UE and second UE for MU-MIMO service over the air interface while serving the first UE and second UE comprises configuring air interface transmission between the base station and the first UE to occupy same time-frequency air interface resources as air interface transmission between the base station and the second UE; and
    wherein not grouping together the first UE and second UE for MU-MIMO service over the air interface while serving the first UE and second UE comprises configuring air transmission between the base station and the first UE to occupy different time-frequency air interface resources than air interface transmission between the base station and the second UE.

5. The method of claim 1, wherein the controlling includes:
    making a determination that the primary serving carrier of the second UE is the same as a secondary serving carrier of the first UE rather than being the same as the primary serving carrier of the first UE; and
    based at least on the determination, the base station not grouping together the first UE and second UE for MU-MIMO service over the air interface.

6. The method of claim 1, wherein the serving further includes the base station serving the second UE with carrier aggregation on a plurality of carriers, and wherein the controlling includes:
    making a determination that the primary serving carrier of the first UE is the same as a secondary serving carrier of the second UE rather than being the same as the primary serving carrier of the second UE; and
    based at least on the determination, the base station not grouping together the first UE and the second UE for MU-MIMO service over the air interface.

7. The method of claim 1, wherein the serving further includes the base station serving the second UE with carrier aggregation on a plurality of carriers, and wherein the controlling includes:
    making a determination that the primary serving carrier of the first UE is the same as the primary serving carrier of the second UE; and
    based at least on the determination, the base station grouping together the first UE and the second UE for MU-MIMO service over the air interface.

8. A method for controlling service over an air interface in a wireless communication system, the method comprising:
    serving by a base station a plurality of user equipment devices (UEs) each having a respective primary serving carrier, the plurality of UEs defining multiple candidate groups of UEs, wherein the UEs respectively of each candidate group have a serving carrier in common with each other;
    while so serving the plurality of UEs, deciding by the base station which candidate group of UEs to group together with each other for Multi-User Multiple-Input-Multiple-Output (MU-MIMO) service, wherein the base station gives higher priority to grouping a first one of the candidate groups of UEs together with each other for MU-MIMO service than to grouping a second one of the candidate groups of UEs together with each other for MU-MIMO service, the giving of higher priority being based at least on the UEs of the first candidate group having a primary serving carrier in common with each other and the UEs of the second candidate group not having a primary serving carrier in common with each other; and controlling by the base station configuration of MU-MIMO service in accordance with the deciding.

9. The method of claim 8, wherein the deciding comprises:

based at least on the giving of higher priority to grouping the first candidate group of UEs together with each other or MU-MIMO service than to grouping the second candidate group of UEs together with each other for MU-MIMO service, deciding to group the first candidate group of UEs together with each other for MU-MIMO service rather than to group the second candidate group of UEs together with each other for MU-MIMO service.

10. The method of claim 9, wherein deciding to group the first candidate group of UEs together with each other for MU-MIMO service is further based on a determination that beam direction from the base station to each UE of the first candidate group will be threshold different than beam direction respectively from the base station to each other UE of the first candidate group.

11. The method of claim 9, wherein controlling by the base station the configuration of MU-MIMO service in accordance with the deciding comprises:

grouping by the base station the first candidate group of UEs together with each other for MU-MIMO service rather than grouping the second candidate group of UEs together with each other for MU-MIMO service.

12. The method of claim 11, wherein grouping the first candidate group of UEs together with each other for MU-MIMO service comprises:

configuring air interface transmission between the base station and each UE of the first candidate group to occupy same time-frequency air interface resources as air interface transmission between the base station and each other UE of the first candidate group.

13. The method of claim 8, further comprising:

determining by the base station that the UEs of the first candidate group have a common primary serving carrier and that the UEs of the second candidate group do not have a common primary carrier; and responsive to the determining, giving by the base station the higher priority to grouping the first candidate group of UEs together with each other for MU-MIMO service than to grouping the second candidate group of UEs together with each other for MU-MIMO service.

14. The method of claim 8, wherein the air interface defines a continuum of subframes, the method being carried out on a per-subframe basis.

15. A base station operable in a wireless communication system to control service over an air interface, the base station comprising:

an antenna structure comprising a plurality of antennas for communicating over the air interface, wherein the air interface defines physical channel resources for carrying data wirelessly from the base station to a plurality of user equipment devices (UEs) served by the base station; and a controller for scheduling use of the physical channel resources to carry data wirelessly from the base station to the UEs, wherein the controller is configured to control whether the base station groups at least two of the UEs together with each other as a Multi-User Multiple-Input-Multiple-Output (MU-MIMO) group for MU-MIMO service over the air interface, wherein the controlling occurs when the base station is serving at least one of the at least two UEs with carrier aggregation on a plurality of carriers, and wherein the controlling is based at least on whether the at least two UEs have a primary serving carrier in common with each other.

16. The base station of claim 15, wherein the controlling is additionally based on a determination that beam direction from the base station to each UE of the at least two UEs will be threshold different than beam direction respectively from the base station to each other UE of the at least two UEs.

17. The base station of claim 15, wherein the controlling includes:

making a determination of whether the at least two UEs have the same primary serving carrier as each other;

if the determination is that the at least two UEs have the same primary serving carrier as each other, then, based at least in part on the determination, causing the base station to group together the at least two UEs for MU-MIMO service over the air interface; and if the determination is that the at least two UEs do not have the same primary serving carrier as each other, then, based at least in part on the determination, causing the base station to not group together the at least two UEs for MU-MIMO service over the air interface.

18. The base station of claim 17, wherein grouping together the at least two UEs for MU-MIMO service over the air interface comprises configuring air interface transmission between the base station and each UE of the at least two UEs to occupy same time-frequency air interface resources as air interface transmission between the base station and each other UE of the at least two UEs.

19. The base station of claim 15, wherein the controlling includes:

making a determination that the primary serving carrier of a given one of the at least two UEs is the same as a secondary serving carrier of another one of the at least two UEs rather than being the same as the primary serving carrier of the other UE of the at least two UEs; and based at least on the determination, causing the base station to not group together the at least two UEs for MU-MIMO service over the air interface.

20. The base station of claim 15, wherein the antenna structure defines a massive-MIMO array.

* * * * *